United States Patent
Lee et al.

(10) Patent No.: US 10,665,094 B2
(45) Date of Patent: May 26, 2020

(54) METHOD, MOBILE DEVICE, AND SYSTEM FOR THE MESSAGE TRANSMISSION OF A VULNERABLE ROAD USER

(71) Applicant: Industrial Technology Research Institute, Hsinchu (TW)

(72) Inventors: Yi-Jing Lee, New Taipei (TW); Po-Chun Kang, Hsinchu County (TW); Tzu-Hsiang Su, Taichung (TW); Chia-Tai Tsai, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 12 days.

(21) Appl. No.: 15/825,120

(22) Filed: Nov. 29, 2017

(65) Prior Publication Data
US 2018/0342154 A1 Nov. 29, 2018

(30) Foreign Application Priority Data
May 24, 2017 (TW) .............................. 106117093 A (51) Int. Cl.
*H04M 3/42* (2006.01)
*G08G 1/005* (2006.01)
(Continued)

(52) U.S. Cl.
CPC ............. *G08G 1/005* (2013.01); *G08G 1/166* (2013.01); *H04W 4/40* (2018.02); *H04W 4/70* (2018.02)

(58) Field of Classification Search
CPC ............. G06Q 30/02; H04L 29/08657; H04M 2207/18; H04W 4/02; H04W 8/18;
(Continued)

(56) References Cited

U.S. PATENT DOCUMENTS 8,738,280 B2 5/2014 Haran
9,786,178 B1* 10/2017 Bai .................. G08G 1/166
(Continued)

FOREIGN PATENT DOCUMENTS

CN 102917004 2/2013
CN 203793212 8/2014
(Continued)

OTHER PUBLICATIONS

Peter Baumung et al.,"Stable, Congestion-Controlled Application-Layer Multicasting in Pedestrian Ad-hoc Networks", Sixth IEEE International Symposium on a World of Wireless Mobile and Multimedia Networks, Jun. 2005,pp. 57-64.
(Continued)

*Primary Examiner* — Khoi H Tran
*Assistant Examiner* — B M M Hannan
(74) *Attorney, Agent, or Firm* — JCIPRNET (57) ABSTRACT

A method, a mobile device, and a system for message transmission of a vulnerable road user (VRU) are provided. The method is adapted to a first mobile device of a first VRU and includes the following steps. Whether there exists a target mobile device within a preset range of the first VRU is determined, where the target mobile device is a mobile device that has already broadcast a personal safety message (PSM). When the target mobile device exists within the preset range, whether to broadcast a first PSM is determined according to a relative distance between the target mobile device and an intersection as well as a relative distance between the target mobile device and the first mobile device. When the target mobile device doesn't exist within the preset range, the first PSM is broadcast.

20 Claims, 6 Drawing Sheets

(51) Int. Cl.
*H04W 4/40* (2018.01)
*H04W 4/70* (2018.01)
*G08G 1/16* (2006.01)

(58) Field of Classification Search
CPC ....... H04W 4/70; H04W 4/046; H04W 4/005; G08G 1/005; G08G 1/166
USPC ...................................................... 455/414.2
See application file for complete search history.

(56) References Cited

U.S. PATENT DOCUMENTS

| | | | |
|---|---|---|---|
| 2010/0222078 A1* | 9/2010 | Tysowski | G01C 21/3682 455/456.3 |
| 2013/0210460 A1* | 8/2013 | Subramanian | B61L 15/0027 455/456.3 |
| 2013/0281141 A1 | 10/2013 | Rubin et al. | |
| 2014/0045556 A1* | 2/2014 | Subramanian | H04W 52/0251 455/574 |
| 2014/0051346 A1* | 2/2014 | Li | H04W 4/046 455/3.01 |
| 2015/0035685 A1* | 2/2015 | Strickland | B60Q 9/008 340/901 |
| 2015/0091740 A1 | 4/2015 | Bai et al. | |
| 2015/0172956 A1 | 6/2015 | Noh et al. | |
| 2016/0049079 A1 | 2/2016 | Ibrahim et al. | |
| 2016/0318445 A1* | 11/2016 | Sugimoto | B60Q 9/008 |
| 2016/0381538 A1* | 12/2016 | Tan | H04W 4/90 455/404.2 |
| 2017/0018187 A1* | 1/2017 | Kim | G08G 1/166 |
| 2017/0372612 A1* | 12/2017 | Bai | G08G 1/161 |
| 2018/0061232 A1* | 3/2018 | Madigan | G08G 1/065 |
| 2018/0090005 A1* | 3/2018 | Philosof | G08G 1/163 |
| 2018/0262865 A1* | 9/2018 | Lepp | H04W 4/80 |
| 2018/0324694 A1* | 11/2018 | Uchiyama | H04W 76/14 |

FOREIGN PATENT DOCUMENTS

| | | |
|---|---|---|
| CN | 104933893 | 9/2015 |
| CN | 105355085 | 2/2016 |
| EP | 2807837 | 12/2014 |
| JP | 2013164777 | 8/2013 |
| TW | 201002912 | 1/2010 |
| TW | 201416268 | 5/2014 |
| WO | 2015165002 | 11/2015 |
| WO | 2017054282 | 4/2017 |

OTHER PUBLICATIONS

Andrea Gorrieri et al.,"DiSIF: A Distance-Based Silencing Technique for Multi-Hop Broadcast Communications in Pedestrian Ad-Hoc Networks",IEEE Transactions on Mobile Computing, vol. 15, No. 11, Dec. 17, 2015 , pp. 2706-2718.

Mattia Minelli et al.,"The Potential of Transmit Data Rate Control for Channel Congestion Mitigation in VANET", 2016 International Wireless Communications and Mobile Computing Conference (IWCMC), Sep. 5-9, 2016, pp. 262-267.

Kamran Ali et al.,"Architecture for Public Safety Network Using D2D Communication", Wireless Communications and Networking Conference (WCNC), Apr. 3-6, 2016, pp. 1-6.

Gwanghyeon Kim et al.,"A Request Based Adaptive Beacon Rate Control Scheme for Vehicular Ad-hoc Networks",2016 Eighth International Conference on Ubiquitous and Future Networks (ICUFN), Jul. 5-8, 2016,pp. 67-69.

Imen Achour et al.,"A Redundancy-based Protocol for Safety Message Dissemination in Vehicular Ad Hoc Networks", Vehicular Technology Conference (VTC Fall), 2015 IEEE 82nd, Sep. 6-9, 2015, pp. 1-6.

"Notice of allowance of Taiwan Counterpart Application", dated Feb. 6, 2018, p. 1-p. 4, in which the listed references were cited.

Sungwon Lee et al., "An Energy Efficient Vehicle to Pedestrian Communication Method for Safety Applications", Wireless Pers Commun, Dec. 2015, pp. 1845-1856.

"Search Report of Europe Counterpart Application", dated Jun. 5, 2018, p. 1-p. 10.

* cited by examiner

METHOD, MOBILE DEVICE, AND SYSTEM FOR THE MESSAGE TRANSMISSION OF A VULNERABLE ROAD USER

CROSS-REFERENCE TO RELATED APPLICATION

This application claims the priority benefit of Taiwan application serial no. 106117093, filed on May 24, 2017. The entirety of the above-mentioned patent application is hereby incorporated by reference herein and made a part of this specification.

BACKGROUND OF THE INVENTION

1. Field of the Invention

The technical field generally relates to a technology for the message transmission of a vulnerable road user.

2. Description of Related Art

Currently, the network vehicle market focuses on the communication software and the system integration of the vehicle to everything (V2X). Particularly, vehicle to pedestrian (V2P) is the center of attention. In a general safety application system of the V2P, a moving vehicle could obtain its position, direction, latitude and longitude by its own global positioning system (GPS), and communicate with a vulnerable road user nearby by periodically broadcasting basic safety message (BSM) packets with a dedicated short-range communications (DSRC) technology.

On the other hand, in a pedestrian to vehicle (P2V) application system, vulnerable road users actively broadcast personal safety message (PSM) packets for communicating with the near vehicles by their mobile devices to protect themselves. However, when the number of the vulnerable road users exceeds the load of the network bandwidth, a large amount of messages could cause network congestion and further threaten the safety of the vulnerable road users.

Therefore, this disclosure provides a method, a mobile device and a system for the message transmission to reduce the amount of PSM packets and efficiently prevent the network congestion.

SUMMARY OF THE INVENTION

According to an embodiment of this disclosure, a message transmission method suitable for a first mobile device of a first vulnerable road user (VRU) includes the following steps. Whether there exists a target mobile device within a preset range of the first VRU is determined, wherein the target mobile device is a mobile device that has already broadcast a personal safety message (PSM). When the target mobile device exists within the preset range, whether to broadcast a first PSM is determined according to a relative distance between the target mobile device and an intersection as well as a relative distance between the target mobile device and the first mobile device, wherein the first PSM is a PSM of the first mobile device. When the target mobile device doesn't exist within the preset range, the first PSM is broadcast.

According to an embodiment of this disclosure, the mobile device held by the first VRU includes a positioning module, a communication module, a memory and a processor, wherein the processor is coupled to the positioning module, the communication module and the memory. The positioning module detects a position of the mobile device. The communication module broadcasts and receives messages. The memory stores data. The processor determines whether there exists a target mobile device within a preset range of the first VRU, wherein the target mobile device is a mobile device that has already broadcast a PSM. When the processor determines that the target mobile device exists within the preset range, whether to broadcast a first PSM is determined according to a relative distance between the target mobile device and an intersection as well as a relative distance between the target mobile device and the mobile device, wherein the first PSM is a PSM of the first mobile device. When the processor determines that the target mobile device doesn't exist within the preset range, the first PSM is broadcast through the communication module.

According to an embodiment of this disclosure, a message transmission system of VRUs includes at least one vehicle and at least one mobile device of at least one VRU, wherein the at least one mobile device includes a first mobile device of a first VRU. The first mobile device determines that whether there exists a target mobile device within a preset range of the first VRU, wherein the target mobile device is a mobile device that has already broadcast a PSM to the vehicle and the first mobile device. When the target mobile device exists within the preset range, the first mobile device determines whether to broadcast a first PSM to the vehicle and the mobile device of another VRU according to a relative distance between the target mobile device and an intersection as well as a relative distance between the target mobile device and the first mobile device, wherein the first PSM is a PSM of the first mobile device. When the target mobile device doesn't exist within the preset range, the first mobile device broadcasts the first PSM to the at least one vehicle and mobile devices of other VRUs of the VRUs.

The foregoing will become better understood from a careful reading of a detailed description provided herein below with appropriate reference to the accompanying drawings

DESCRIPTION OF THE EMBODIMENTS

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 1:
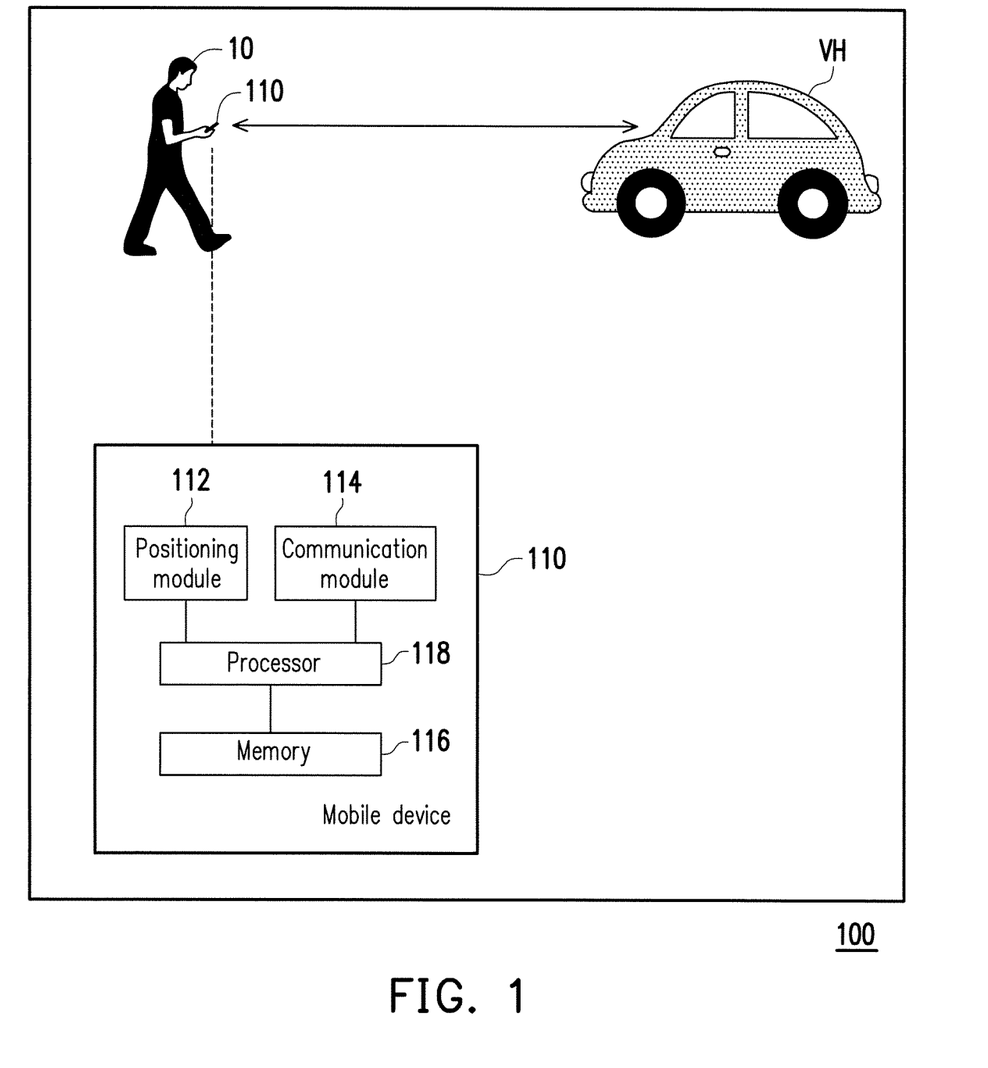
FIG. 1 shows a block diagram of a message transmission system for a road user according to an embodiment of this disclosure.

FIG. 1 shows a block diagram of a message transmission system for a road user according to an embodiment of this disclosure. FIG. 1 introduces all elements and the configuration relationship thereof in the message transmission system for the road user. Detailed functions will also be disclosed with appropriate reference to the accompanying flowcharts of the following embodiments.

Referring to FIG. 1, a message transmission system 100 includes mobile devices of plural VRUs and plural vehicles. For the sake of convenience of description, only one mobile device of one VRU (that is, a first mobile device 110 of a first VRU) and one vehicle (that is, a vehicle, VH) are shown. The rest can be done in the same manner.

The first mobile device 110 includes a positioning module 112, a communication module 114, a memory 116 and a processor 118. The processor 118 is coupled to the positioning module 112, the communication module 114 and the memory 116. The first mobile device 110 could be, but not limited to a handheld electronic device (such as a smart phone, a tablet, a personal digital assistance, and so on), and a wearable electronic device (such as a smart watch, smart eyeglasses, a smart head-mounted device, and so on).

The positioning module 112 detects a position of the first mobile device 110. The positioning module 112 could be, for example, a global positioning system (GPS) system, a station utilizing a global system for mobile communication (GSM), a station of a personal handy-phone system (PHS), a station of a code division multiple access (CDMA) system or a device utilizing a wireless fidelity (Wi-Fi) hotspot to locate its position. In the following description of embodiments, the position of the first mobile device 110 is the same as that of the first VRU.

The communication module 114 receives and transmits messages. The communication module 114 could be compatible with, for example, the wireless access in the vehicular environment (WAVE) and the dedicated short range communications (DSRC) communication interface of IEEE 802.11p standard. In addition, an interface for a GSM communication protocol, a PHS communication protocol, a CDMA communication protocol, a Wi-Fi communication protocol, a WiMAX communication protocol, a 3G/4G/5G protocol, a LTE protocol, a Bluetooth communication protocol, etc. could be integrated into the communication module 114 according to application needs.

The memory 116 stores buffer data, permanent data, and compiled codes for performing functions of the mobile device 110. The memory 116 could be a non-temporary memory, a volatile memory or a non-volatile memory.

The processor 118 controls the operations of the components of the mobile device 110. The processor 118 could be such as a central processing unit (CPU), a general-purpose or a special-purpose programmable devices, a microprocessor, a digital signal processor (DSP), a programmable controller, an application specific integrated circuits (ASIC), a programmable logic device (PLD), an application processor (AP) or the like, or the combinations thereof.

A person having ordinary skill in the art realizes that the vehicle VH comprises the components corresponding to the first mobile device 110 to achieve the communication between the vehicle VH and the VRU 10. In this embodiment, message sets defined in SAE J2735 for road safety applications are adopted. The vehicle VH could obtain its position information through its positioning module (not shown) and periodically broadcast basic safety message (BSM) packets with DSRC through the communication module (not shown) to the first VRU 10 nearby, wherein the BSM packets contain information including the identity (ID), the latitude, the longitude, the speed and the direction of the vehicle VH. On the other hand, the first mobile device 110 of the first VRU 10 also periodically broadcasts PSM packets through the communication module 114 to the vehicle VH and other near VRUs, wherein the PSM packets contain the ID, the latitude, the longitude, the speed, the direction and the route of the first mobile device 110.

In addition, the first mobile device 110 could include an alarm module (not shown). When the processor 118 determines that a collision is about to happen according to the received BSM packets, the alarm module could warn the VRU 10 with vibration, sound or lighting to prevent the collision. Similarly, the vehicle VH could also include an alarm module (not shown). When the processor of the vehicle VH determines that a collision is about to happen according to the received PSM packets, the alarm module could warn the driver of the vehicle VH with vibration, sound or lighting to prevent the collision.

Take an embodiment of an intersection with each driving direction having two lanes as an example, assuming that a communication range is 250 m while there are 50 vehicles which are going to communicate at each driving direction. If the coding transmitting speed of QPSK 3/4 is 9 Mbps and the real bandwidth utilization rate in air is 0.7, the total available bandwidth of QPSK 3/4 equals to 9 Mbps×0.7 (that is, 6.3 Mbps). Take a BSM packet with an average packet length of 300 bytes as an example. Assume that every vehicle broadcasts one message every 100 ms (that is, the frequency is 10 Hz), the bandwidth used for all vehicles at the intersection will be 200×10 Hz×300 bytes×8 bit (that is, 4.8 Mbps). The remaining available bandwidth can only be used for 62 VRUs to transmit safety messages, wherein the number 62 is derived from $(6.3-4.8) \times 10^6 / (10 \text{ Hz} \times 300 \text{ bytes} \times 8 \text{ bit})$. Therefore, when there are more than 62 VRUs at the intersection, the volume of the message data exceeding the load of the bandwidth will cause the network congestion. The following embodiments accompanying with the system in FIG. 1 will introduce a transmission mechanism which could dynamically adjust the transmission mechanism of the PSM packets of a VRU to prevent the network congestion effectively.

Figure 2:
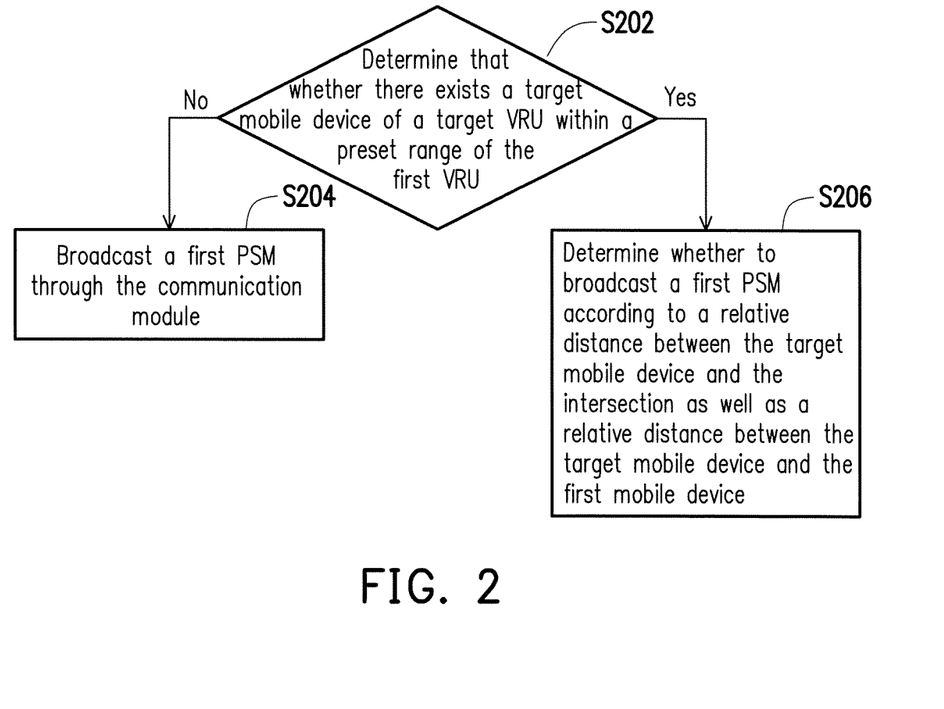
FIG. 2 shows a flowchart of a message transmission method for a VRU according to an embodiment of this disclosure.

FIG. 2 shows a flowchart of a message transmission method for a VRU according to an embodiment of this disclosure. The steps in FIG. 2 could be performed by the message transmission system 100 in FIG. 1. When the first VRU 10 walking from indoor to outdoor is detected by the processor 118 of the first mobile device 110, the steps in FIG. 2 is started. In other embodiments, the steps in FIG. 2 could also be activated by the processor 118 according to the manual activation of the first VRU 10, a predetermined time of a day, and a time point of the first VRU 10 walking through a dangerous area being detected, but the scope of the disclosure is not limited thereto.

Please refer to FIG. 1 and FIG. 2, first, the processor 118 of the first mobile device 110 determines that whether there exists a target mobile device of a target VRU within a preset range of the first VRU 10 (step S202). The target mobile device of the target VRU is a mobile device that has already broadcast a PSM. The preset range could be a preset angle range in front of the first VRU 10. In other words, the processor 118 could determine whether the target mobile device exists within the preset angle range in front of the first VRU 10, when the communication module 114 has received a PSM broadcast from other mobiles. If so, the processor 118 directly determines that there is the target mobile device within the preset range. In another embodiment, the processor 118 could further determine that whether the moving directions within a tolerance range of the first mobile device 10 and other mobile devices within the preset range are the same. If so, the processor 118 determines that there is the target mobile device within the preset range.

When the processor 118 determines that there is no target mobile device of the target VRU within the preset range, the processor 118 broadcasts a first PSM through the communication module 114 (step S204). The first PSM is the PSM of the mobile device 110. The vehicle VH and other mobile devices in the message transmission system 100 will receive the first PSM broadcast by the first mobile device 110. It is noteworthy that if the communication module 114 has not received PSM broadcast from any of other mobile devices, it also means that the target mobile device doesn't exist within the preset range.

On the other hand, when the processor 118 determines that the target mobile device of the target VRU exists within the preset range, the processor 118 determines whether to broadcast a first PSM according to a relative distance between the target mobile device and the intersection as well as a relative distance between the target mobile device and the first mobile device 110 (step S206). The processor 118 determines the position information of the target mobile device according to the received PSM, and receives the position information of the first mobile device 110 through the positioning module 112. In addition, the processor 118 could further determine the position information of the intersection according to a geographic information system (GIS) or the signal phase and time (SPaT) and the map data acquired from the communication module 114. Therefore, the processor 118 could determine whether the first mobile device broadcasts the first PSM according to the relative distance between the target mobile device and the intersection as well as the relative distance between the target mobile device and the first mobile device 110. Detailed description for this step will be disclosed in the following embodiments.

Figure 3:
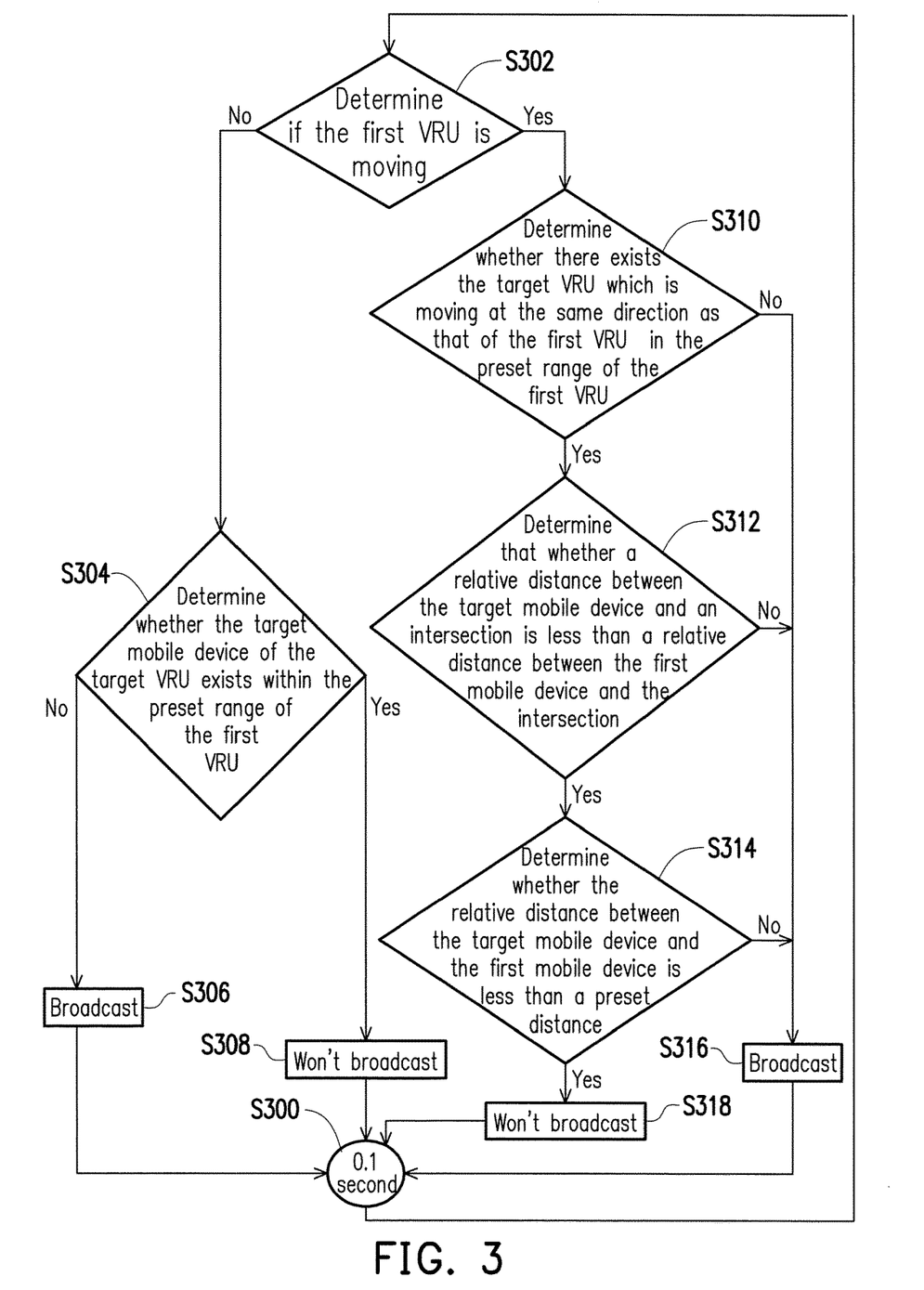
FIG. 3 shows a flowchart of a safety message transmission method for a VRU according to an embodiment of this disclosure.

FIG. 3 shows a flowchart of a safety message transmission method for a VRU according to an embodiment of this disclosure. The steps in FIG. 3 could be performed by the message transmission system 100 in FIG. 1.

Referring to FIG. 1 and FIG. 3, the processor 118 of the first mobile device 110 determines if the first VRU 10 is moving (step S302). The processor 118 determines if the first VRU 10 is moving according to whether the positions of the first mobile device 110 detected by the positioning module 112 are different during a continuous period of time or according to an additional motion detection sensor (not shown) of the first mobile device 110. When the processor 118 determines that the first VRU 10 is not moving, the processor 118 determines whether the target mobile device of the target VRU exists within the preset range of the first VRU 10 (step S304) and further determines whether to broadcast the first PSM. The target mobile device is the abovementioned target mobile device which has already broadcast PSM.

When the processor 118 determines that there is no the target mobile device of the target VRU within the preset range, the processor 118 broadcasts the first PSM through the communication module 114 (step S306). On the other hand, when the processor 118 determines that there is the target mobile device which has already broadcast the PSM within the preset range, the communication module 114 won't broadcast the first PSM (step S308) to reduce the network transmission load. The reason is the first VRU 10 is stationary and thus the collision possibility is lower.

Figure 4:
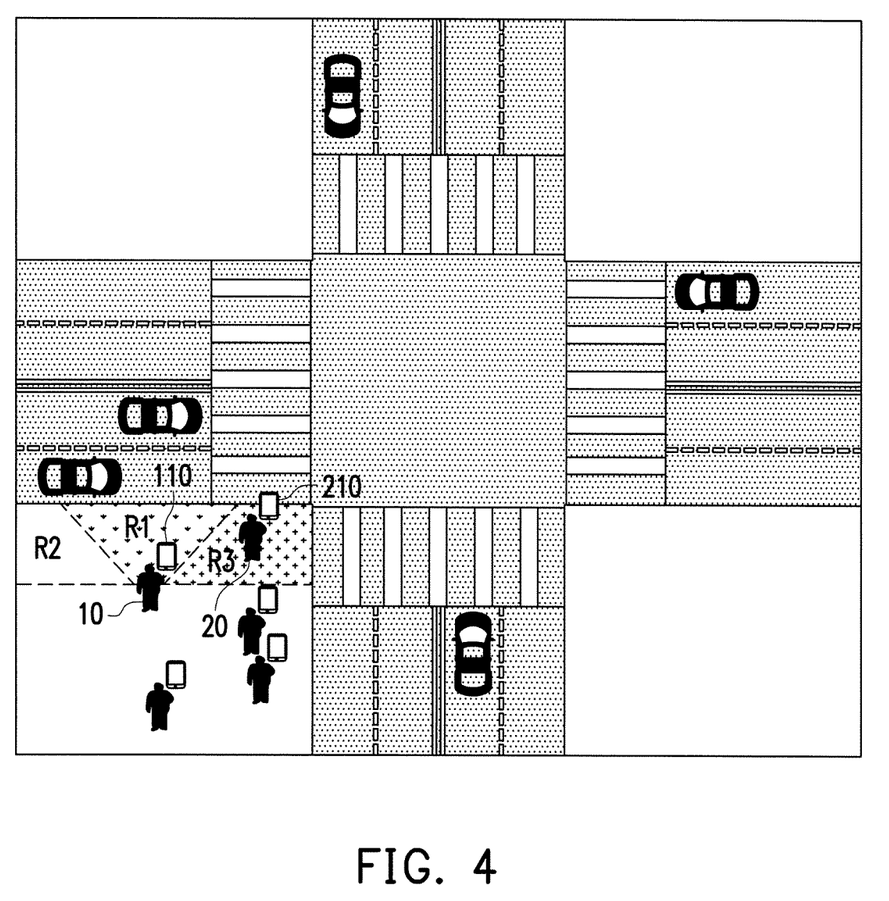
FIG. 4 shows a scenario of a safety message transmission system for a road user according to an embodiment of this disclosure.

Take the FIG. 4 as an example of illustration. FIG. 4 shows a scenario of a safety message transmission system for a road user according to an embodiment of this disclosure.

Referring to FIG. 4, the preset range in front of the first VRU 10 includes R1~R3. The target mobile device 210 of the target VRU 20 which has already broadcast a PSM exists in this preset range. Therefore, the first mobile device 110 won't broadcast the first PSM.

In another embodiment, the preset rage could be divided into plural ranges for carefully determining whether to broadcast the first PSM. Take FIG. 4 as an example, the first VRU 10 is located in the first range R1. The process 118 determines that the target mobile device 210 is located in the third range R3 and is not located in the same range as that of the mobile device 110 which is located in the first range R1. The processor 118 will still broadcast the first PSM through the communication module 114 since there is a possibility that the first VRU 10 located in the first range R1 and the target VRU 20 located in the third range R3 will move toward different directions afterwards. In other words, on the premise of that the amount of the PSM is controlled, there is at least one person in each of ranges R1, R2 and R3 for broadcasting the PSM to precisely provide the PSM to the vehicle VH.

Referring back to FIG. 3, which is similar to the steps S202~S204, when the processor 118 determines that the VRU 10 is moving, the processor 118 determines whether there exists the target VRU which is moving at the same direction as that of the first VRU 10 in the preset range of the first VRU 10 (step S310). Wherein, there is a tolerant bias of angle range during the determination process for the processor 118 to determine the directions. When there is no the target VRU which is moving at the same direction as that of the first VRU 10 in the preset range of the first VRU 10, the processor 118 broadcasts the first PSM through the communication module 114 (step S316).

On the other hand, when there exists the target VRU which is moving at the same direction as that of the first VRU 10, the processor 118 determine that whether a relative distance between the target mobile device and an intersection is less than a relative distance between the first mobile device 110 and the intersection (step S312). When the relative distance between the target mobile device and the intersection is not less than the relative distance between the first mobile device 110 and the intersection, it means that comparing with the target mobile device, the first mobile device 110 is closer to the intersection while the collision possibility of the first mobile device 110 is higher. The communication module 114 will broadcast the first PSM (step S316) to avoid that the first VRU 10 is collided by the vehicle VH.

When the relative distance between the target mobile device and the intersection is less than the relative distance between the first mobile device 110 and the intersection, it means that comparing with the target mobile device, the first mobile device 110 is closer to the intersection. The processor 114 further determines whether the relative distance between the target mobile device and the first mobile device 110 is less than a preset distance (step S314). The preset distance could be a fixed value stored in the memory 116 in advance, or a dynamic value generated by the processor 114 according to the moving speed or other parameters of the first mobile device 110. If the determination result of step S314 is YES, it means that the distance between the first mobile device 110 and the target mobile device is close and thus the communication module 114 won't broadcast the PSM (step S318). If the determination result of step S314 is NO, it means that the distance between the first mobile device 110 and the target mobile device is not close enough to prevent the first VRU 10 from being hit by the vehicle VH and thus the communication module 114 still broadcasts the first PSM (step S316).

Figure 5:
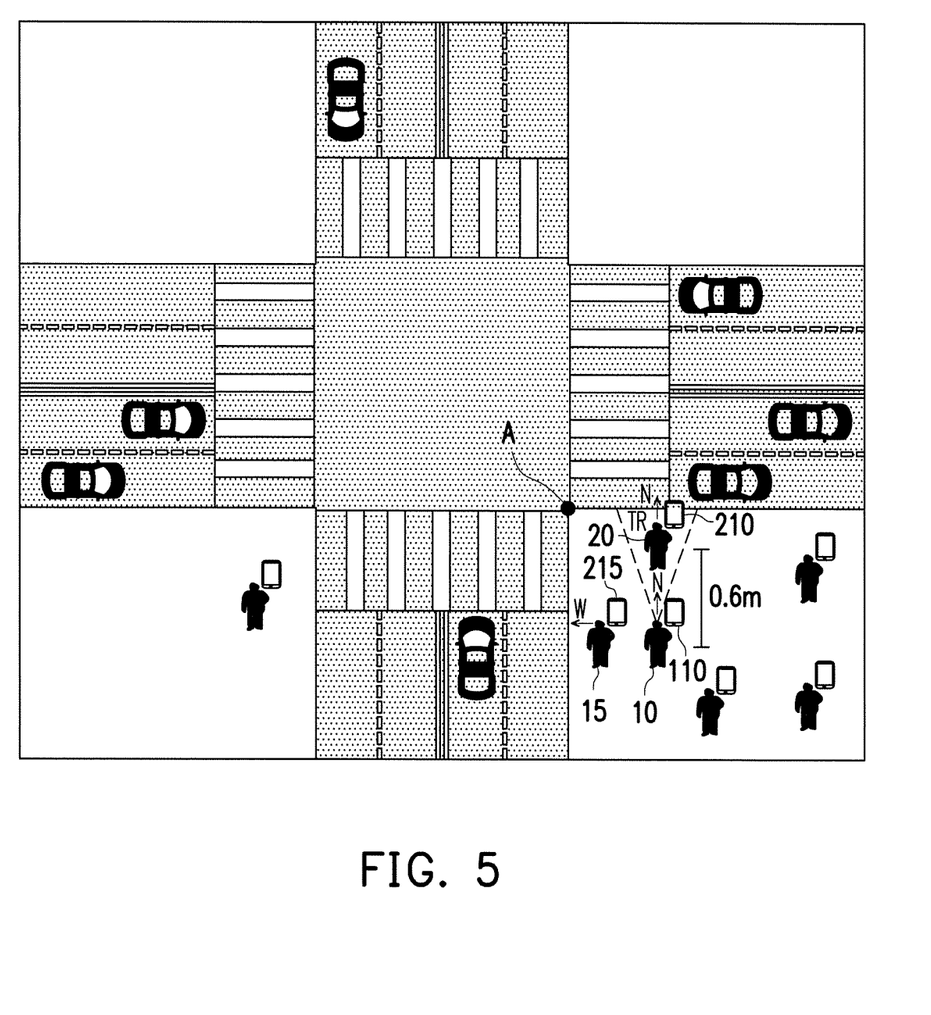
FIG. 5 shows a scenario of a safety message transmission system for a road user according to another embodiment of this disclosure.

FIG. 5 shows a scenario of a safety message transmission system for a road user according to another embodiment of this disclosure.

Assuming that the preset range is a 30-degree included angle range TR in front of the first VRU 10, there is the target mobile device 210 of the target VRU 20 within this range TR. The target mobile device 210 has already broadcast PSM, wherein the directions of the target VRU 20 and the first VRU 10 are the same (toward north). In addition, because the second VRU 15 is not located in the range TR and the moving direction (toward west) of the VRU 15 is different from that of the first VRU 10, the second VRU 15 is not considered to be located within the preset range of the first VRU 10. For example, the preset distance is set to be one meter (1 M). Comparing with the first VRU 10, the target VRU 20 is closer to the intersection A. The relative distance between the first VRU 10 and the target VRU 20 is 0.6 M (that is, less than the preset distance 1 M). Therefore, the first mobile device 110 won't broadcast the first PSM.

Figure 6:
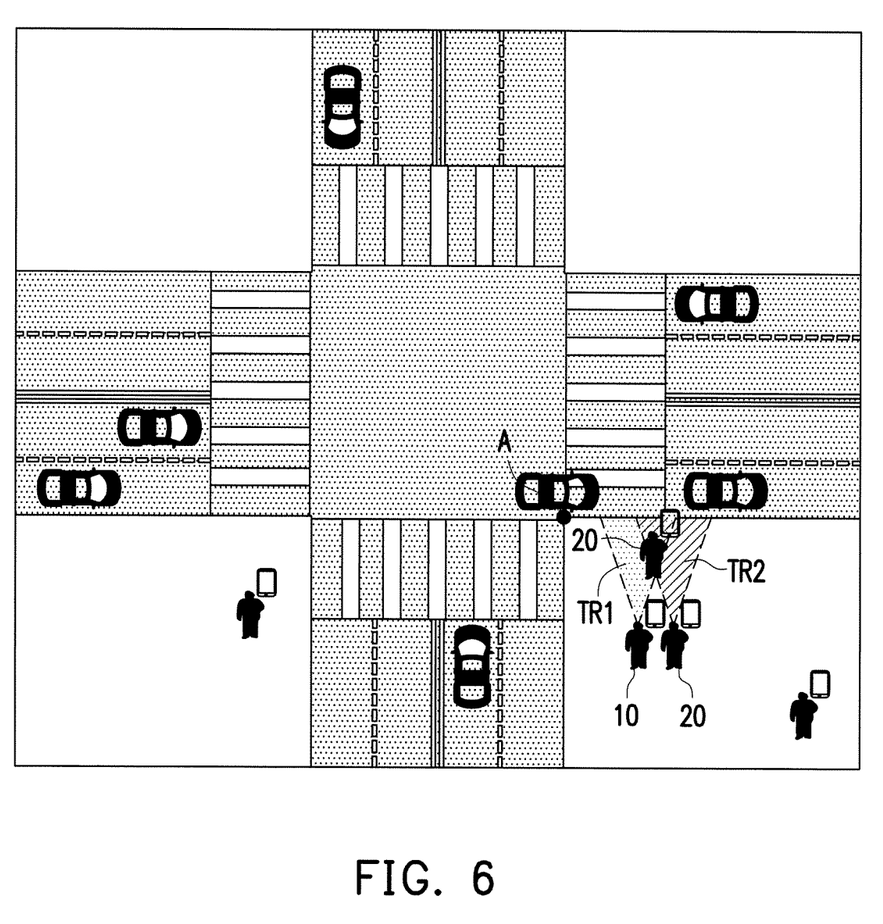
FIG. 6 shows a scenario of a safety message transmission system for a road user according to yet another embodiment of this disclosure.

FIG. 6 shows a scenario of a safety message transmission system for a road user according to yet another embodiment of this disclosure.

For example, the preset range is a 30-degree included angle range TR in front of the first VRU 10 and the second VRU 15. There is the target mobile device 210 of the target VRU 20 within this range TR. The target mobile device 210 has already broadcast PSM. The directions of the target VRU 20, the first VRU 10 and the second VRU 15 are the same. Comparing with the target VRU 20 and the first VRU 10, the second VRU 15 is closer to the intersection A. Also, both the relative distance between the first VRU 10 and the target VRU 20 and the relative distance between the second VRU 15 and the target VRU 20 are less than the preset distance. Therefore, the first mobile device 110 and the second mobile device 215 won't broadcast the first PSM.

When the processor 118 completes the steps of S306, S308, S316 or S318, it will enter step S300 for returning to step S302 for another safety message transmission process. The frequency of the processor 118 entering step S300 could be, for example, once per 0.1 second.

In summary, this disclosure provides a method, a mobile device, and a system for message transmission of a VRU. When the mobile device of the VRU receives a PSM from another target mobile device with high collision risk, the mobile device will evaluate its potential collision risk to decide whether to broadcast a PSM. This disclosure could reduce the amount of PSM packets and efficiently prevent the network congestion. VRUs could still keep the same safety level of road user and reduce the power consumption of the mobile device to increase the competitive advantage of the product.

It will be apparent to those skilled in the art that various modifications and variations can be made to the structure of the disclosed embodiments. It is intended that the specification and examples be considered as exemplars only, with a true scope of the disclosure being indicated by the following claims and their equivalents.

What is claimed is:

1. A message transmission method for a vulnerable road user (VRU), the message transmission method adapted to a first mobile device of a first VRU, and the message transmission method comprising:
   determining whether there exists a target mobile device of a target VRU within a preset range of the first VRU by the first mobile device, wherein the target mobile device has already broadcast a personal safety message (PSM);
   determining whether to broadcast a first PSM by the first mobile device according to a relative distance between the target mobile device and an intersection as well as a relative distance between the target mobile device and the first mobile device, when the target mobile device exists within the preset range;
   broadcasting the first PSM by the first mobile device, when the target mobile device doesn't exist within the preset range; and
   not broadcasting the first PSM by the first mobile device, when the relative distance between the target mobile device and the intersection is less than a relative distance between the first mobile device and the intersection and when the relative distance between the target mobile device and the first mobile device is less than a preset distance.

2. The message transmission method as claimed in claim 1, wherein the step of determining whether there exists the target mobile device of the target VRU within the preset range of the first VRU by the first mobile device comprises:
   determining whether there exists the target mobile device within the preset range by the first mobile device according to a determination of whether there exists another mobile device within a preset angle range in front of the first VRU, when a PSM of a mobile device of another VRU is received.

3. The message transmission method as claimed in claim 2, wherein the step of determining that whether there exists the target mobile device of the target VRU within the preset range of the first VRU by the first mobile device comprises:
   determining whether there exists the target mobile device by the first mobile device according to a determination of whether a moving direction of the another VRU and a moving direction of the first VRU are the same.

4. The message transmission method as claimed in claim 1, wherein the step of determining that whether there exists the target mobile device of the target VRU within the preset range of the first VRU comprises:
   determining that the target mobile device doesn't exist in the preset range of the first VRU by the first mobile device, when any PSM is not received.

5. The message transmission method as claimed in claim 1, wherein the step of determining whether to broadcast the first PSM by the first mobile device according to the relative distance between the target mobile device and the intersection as well as the relative distance between the target mobile device and the first mobile device, comprises:
   determining whether the relative distance between the target mobile device and the intersection is less than the relative distance between the first mobile device and the intersection by the first mobile device;
   determining whether the relative distance between the target mobile device and the first mobile device is less than the preset distance by the first mobile device, when the relative distance between the target mobile device and the intersection is less than the relative distance between the first mobile device and the intersection.

6. The message transmission method as claimed in claim 5, further comprising:
broadcasting the first PSM by the first mobile device, when the relative distance between the target mobile device and the intersection is not less than the relative distance between the first mobile device and the intersection.

7. The message transmission method as claimed in claim 5, further comprising:
broadcasting the first PSM by the first mobile device, when the relative distance between the target mobile device and the first mobile device is not less than the preset distance.

8. The message transmission method as claimed in claim 5, wherein before the step of determining that whether there exists the target mobile device within the preset range of the first VRU, the method further comprises:
determining whether the first VRU is moving by the first mobile device; and
determining whether to broadcast the first PSM by the first mobile device according to a determination result of whether there exists the target mobile device within the preset range of the first VRU, when the first VRU is not moving.

9. The message transmission method as claimed in claim 8, further comprising:
not broadcasting the first PSM by the first mobile device, when there exists the target mobile device within the preset range; and
broadcasting the first PSM by the first mobile device, when there doesn't exist the target mobile device within the preset range.

10. The message transmission method as claimed in claim 8, wherein the preset range includes plural sections and the first VRU is located in a first section of the plural sections, and the method further comprises:
not broadcasting the first PSM by the first mobile device, when there exists the target mobile device within the first section of the preset range; and
broadcasting the first PSM by the first mobile device, when there doesn't exist the target mobile device within the first section of the preset range.

11. A mobile device held by a first vulnerable road user (VRU), comprising:
a positioning sensor, detecting a position of the mobile device;
a communication transceiver, broadcasting and receiving a message;
a memory, storing data;
a processor coupled to the positioning sensor, the communication transceiver and the memory, wherein the processor determines whether there exists a target mobile device of a target VRU within a preset range of the first VRU, wherein the target mobile device has already broadcast a personal safety message (PSM);
wherein when the processor determines that the target mobile device exists within the preset range, the processor determines whether to broadcast a first PSM according to a relative distance between the target mobile device and an intersection as well as a relative distance between the target mobile device and the first mobile device, wherein the first PSM is a PSM of the first mobile device;
wherein when the processor determines that the target mobile device doesn't exist within the preset range, the processor broadcasts the first PSM through the communication transceiver wherein when the processor determines that the relative distance between the target mobile device and the intersection is less than a relative distance between the first mobile device and the intersection and determines that the relative distance between the target mobile device and the first mobile device is less than a preset distance, the processor does not broadcast the first PSM by the first mobile device.

12. The mobile device as claimed in claim 11, wherein when a PSM of another mobile device of another VRU is received by the processor through the communication transceiver, the processor determines whether there exists the target mobile device according to a determination of whether there exists the another mobile device within a preset angle range in front of the first VRU.

13. The mobile device as claimed in claim 12, wherein the processor further determines whether there exists the target mobile device of a target VRU according to a determination of whether a moving direction of the another VRU and the moving direction of the first VRU are the same.

14. The mobile device as claimed in claim 11, wherein the processor determines that the target mobile device doesn't exist in the preset range of the first VRU, when the communication transceiver doesn't receive any PSM.

15. The mobile device as claimed in claim 11, wherein
the processor determines whether the relative distance between the target mobile device and the intersection is less than the relative distance between the first mobile device and the intersection;
when the processor determines that the relative distance between the target mobile device and the intersection is not less than the relative distance between the first mobile device and the intersection, the processor broadcasts the first PSM through the communication transceiver;
when the processor determines that the relative distance between the target mobile device and the intersection is less than the relative distance between the first mobile device and the intersection, the processor determines whether the relative distance between the target mobile device and the first mobile device is less than the preset distance;
when the processor determines that the relative distance between the target mobile device and the first mobile device is less than the preset distance, the processor doesn't broadcast the first PSM; and
when the processor determines that the relative distance between the target mobile device and the intersection is not less than the relative distance between the first mobile device and the intersection, the processor broadcasts the first PSM through the communication transceiver.

16. The mobile device as claimed in claim 15, wherein the processor further determines whether the first VRU is moving, wherein when the processor determines the first VRU is not moving, the processor determines whether to broadcast the first PSM according to a determination result of whether there exists the target mobile device within the preset range of the first VRU.

17. The mobile device as claimed in claim 16, wherein when the processor determines that there exists the target mobile device within the preset range, the processor doesn't broadcast the first PSM through the communication transceiver, and wherein when the processor determines that there doesn't exist the target mobile device within the preset range, the processor broadcast the first PSM through the communication transceiver.

18. The mobile device as claimed in claim 16, wherein the preset range includes plural sections and the first VRU is located in a first section of the plural sections, wherein when the processor determines there exists the target mobile device within the first section of the preset range, the processor doesn't broadcast the first PSM, and wherein when the processor determines there doesn't exist the target mobile device within the first section of the preset range, the processor broadcasts the first PSM through the communication transceiver.

19. A message transmission system of vulnerable road users (VRUs), comprising:
- at least one vehicle; and
- at least one mobile device of at least one VRU, comprising a first mobile device of a first VRU, wherein the first mobile device determines whether there exists a target mobile device of a target VRU within a preset range of the first VRU, wherein the target mobile device has already broadcast a personal safety message (PSM) to the vehicle and the first mobile device;
- when the target mobile device exists within the preset range, the first mobile device determines whether to broadcast a first PSM according to a relative distance between the target mobile device and an intersection as well as a relative distance between the target mobile device and the first mobile device, wherein the first PSM is a PSM of the first mobile device;
- when the target mobile device doesn't exist within the preset range, the first mobile device broadcasts the first PSM to the at least one vehicle and mobile devices of other VRUs of the VRUs; and
- when the first mobile device determines that the relative distance between the target mobile device and the intersection is less than a relative distance between the first mobile device and the intersection and determines that the relative distance between the target mobile device and the first mobile device is less than a preset distance, the first mobile device does not broadcast the first PSM by the first mobile device.

20. The message transmission system as claimed in claim 19, wherein the first mobile device further determines whether the first VRU is moving, wherein when the first mobile device determines the first VRU is not moving, the first mobile device determines whether to broadcast the first PSM according to a determination result of whether there exists the target mobile device within the preset range of the first VRU.

* * * * *